(12) United States Patent
Nomichi et al.

(10) Patent No.: US 8,567,792 B2
(45) Date of Patent: Oct. 29, 2013

(54) GAS SEAL STRUCTURE

(75) Inventors: Kaoru Nomichi, Hyogo (JP); Seiji Ishii, Hyogo (JP); Makoto Ninomiya, Kobe (JP); Yasuji Kanou, Wakayama (JP); Hiroshi Aoshiba, Wakayama (JP); Masaki Kawahigashi, Wakayama (JP); Takeo Kozuki, Wakayama (JP)

(73) Assignee: Kawasaki Jukogyo Kaisha Kabusiha, Kobe-shi (JP)

( * ) Notice: Subject to any disclaimer, the term of this patent is extended or adjusted under 35 U.S.C. 154(b) by 821 days.

(21) Appl. No.: 10/575,687

(22) PCT Filed: Oct. 14, 2004

(86) PCT No.: PCT/JP2004/015548
§ 371 (c)(1),
(2), (4) Date: Apr. 9, 2007

(87) PCT Pub. No.: WO2005/038311
PCT Pub. Date: Apr. 28, 2005

(65) Prior Publication Data
US 2007/0273106 A1    Nov. 29, 2007

(30) Foreign Application Priority Data

Oct. 16, 2003  (JP) ................................ 2003-356513

(51) Int. Cl.
*F16J 15/56*  (2006.01)
(52) U.S. Cl.
USPC .......................................... 277/616; 277/609
(58) Field of Classification Search
USPC ......... 277/349, 351, 549, 551, 589, 530, 609, 277/614, 616, 630, 637
See application file for complete search history.

(56) References Cited

U.S. PATENT DOCUMENTS 2,774,619 A * 12/1956 Mercier .......................... 277/549
3,334,549 A *  8/1967 Sheldon ........................... 92/248
(Continued)

FOREIGN PATENT DOCUMENTS

JP    48061847    8/1973
JP    63-106959   7/1988
(Continued)

OTHER PUBLICATIONS

International Search Report for International Application No. PCT/JP2004/015548 by the Japanese Patent Office dated Jan. 11, 2005 (2 pages).

*Primary Examiner* — Gilbert Lee
(74) *Attorney, Agent, or Firm* — Marshall, Gerstein & Borun LLP

(57) ABSTRACT

A resin sub-seal member (11) provided with a concave groove (16) is disposed at a region closer to a higher-pressure side region than a rubber main seal member (10) and pressure variation in a gas on a higher-pressure side is inhibited from being transmitted to the main seal member (10). Further, a variation reducing space (13) is formed between the seal members (10) and (11) to be able to reduce the pressure variation when gas leakage in the sub-seal member (11) occurs or the sub-seal member (11) responds with a delay with respect to the pressure variation. Thus, rapid change in the pressure of the gas surrounding the main seal member (10) is inhibited, occurrence of the blistering phenomenon is inhibited, and a high seal ability is achieved. The seal structure is formed by a simple structure including the seal members (10) and (11), and the variation reducing space (13).

8 Claims, 17 Drawing Sheets

(56) References Cited

U.S. PATENT DOCUMENTS

| | | | |
|---|---|---|---|
| 3,765,690 A | 10/1973 | Sievenpiper | |
| 3,942,806 A * | 3/1976 | Edlund | 277/589 |
| 4,284,280 A * | 8/1981 | Bertram et al. | 277/558 |
| 4,890,937 A * | 1/1990 | Balsells | 384/16 |
| 5,098,256 A * | 3/1992 | Smith | 415/111 |
| 6,161,838 A * | 12/2000 | Balsells | 277/511 |
| 6,290,235 B1 * | 9/2001 | Albertson | 277/510 |
| 6,435,775 B1 * | 8/2002 | Nish et al. | 405/224.2 |
| 2001/0052676 A1 * | 12/2001 | Omiya et al. | 277/614 |
| 2004/0119241 A1 * | 6/2004 | Castleman | 277/436 |
| 2005/0093246 A1 * | 5/2005 | Dietle et al. | 277/549 |
| 2008/0191427 A1 * | 8/2008 | Tran et al. | 277/630 |

FOREIGN PATENT DOCUMENTS

| | | | |
|---|---|---|---|
| JP | 2002-147615 | | 5/2002 |
| JP | 2004-019782 | | 1/2004 |
| JP | 2004278576 A | * | 10/2004 |
| WO | WO-87/05978 | | 10/1987 |

* cited by examiner

GAS SEAL STRUCTURE

TECHNICAL FIELD

The present invention relates to a seal structure for inhibiting leakage of highly permeable and high-pressure gases such as a hydrogen gas and a helium gas.

BACKGROUND ART

Rubber O-rings that are able to produce high seal ability are used to inhibit leakage of a high-pressure gas, the pressure of which varies less, i.e., is held substantially constant. As the O-rings, O-rings according to "B 2401" of Japanese industrial Standard (JIS) may be used.

Resin seal members are used to inhibit leakage of a gas, the pressure of which varies frequently in a great range between a high pressure and a low pressure.

Although the O-rings advantageously produce high seal ability for the gas with less pressure variation, they may generate a blistering phenomenon if they are used to inhibit leakage of the gas with the above mentioned pressure variation, and are therefore unable to be used to inhibit leakage of the gas with the pressure variation. The blistering phenomenon is such that, when a rubber member is exposed to a high-pressure gas, the high-pressure gas permeates the rubber member and is held therein, and the held high-pressure gas rapidly expands and is about to exit to outside when the pressure of the surrounding gas decreases rapidly, leading to minute bubbles in the interior of the rubber member. Likewise, the blistering phenomenon occurs in the O-rigs. Upon occurrence of the blistering phenomenon, the O-rings lose their seal ability.

In the case of the gases with small molecular weight and high permeability, such as the hydrogen gas and the helium gas, the O-rings tend to increase the amount of permeating gas as the gas pressure increases. Therefore, the O-rings are unable to achieve high seal ability for the highly permeable gases when they are used alone.

The resin seal members are used to inhibit leakage of the gas with pressure variation because it does not generate the blistering phenomenon and has low gas permeability. However, the resin seal members are less flexible than the rubber O-rings and are unable to achieve seal ability as high as that of the rubber O-rings. In addition, the resin seal members are unable to be deformed in response to the rapid pressure variation, and are thus unable to achieve a high seal ability. Especially when the gas pressure turns from a high pressure to a low pressure, the gas tends to leak.

A seal structure that is suitably used to inhibit leakage of the gas, the pressure of which tends to vary greatly and to become a high pressure, has not been created yet.

DISCLOSURE OF THE INVENTION

An object of the present invention is to provide a seal structure that has a simple structure and is suitably used to inhibit leakage of a gas, the pressure of which varies greatly and becomes a high pressure.

According to the present invention, a gas seal structure comprises a main seal means that is made of rubber and is disposed between two seal surfaces; a sub-seal means that is made of resin and is disposed between the two seal surfaces, the sub-seal means being located closer to a higher-pressure region than the main seal means and being provided with a concave groove; and a pressure variation reducing means that is disposed between the main seal means and the sub-seal means and has a variation reducing space connected to a gap formed between the two seal surfaces and having a volume that is able to inhibit occurrence of a blistering phenomenon in the main seal means.

In accordance with the present invention, the resin sub-seal means is disposed at a position closer to the higher-pressure side region than the rubber main seal means. The sub-seal means is able to inhibit a rapid change in the pressure of the gas surrounding the main seal means which may result from a pressure variation in the gas on the higher-pressure side. Further, the pressure variation reducing means is disposed between the main seal means and the sub-seal means. If the gas leaks through the sub-seal means or the sub-seal means responds with a delay with respect to the pressure variation in the gas on the higher-pressure side, the varied pressure of the gas on the higher-pressure side is not directly transmitted to the main seal means but the pressure with variation reduced by the pressure variation reducing means is transmitted to the main seal means. The seal structure is able to surely inhibit rapid change in the pressure of the gas surrounding the main seal means. The seal structure is able to have a high seal ability using the rubber main seal means with a high seal ability, and to inhibit occurrence of the blistering phenomenon in the main seal means because of an influence of the pressure variation of the gas on the higher-pressure side in the large variation range between a high pressure and a low pressure. So, the seal structure of the present invention can be suitably used to inhibit leakage of the gas, the pressure of which varies greatly and becomes a high-pressure. The seal structure is achieved by a simple structure including the main seal means, the sub-seal means, and the pressure variation reducing means.

The sub-seal means may be disposed such that the concave groove opens toward the higher-pressure side region. In accordance with the present invention, the sub-seal means is disposed such that the concave groove opens toward the higher-pressure side region to be able to seal the gap formed between the two seal surfaces. Since the sub-seal means is able to thus seal the gap, the pressure of the gas surrounding the main seal means can be controlled to a low-pressure. Even when the resin sub-seal means is unable to seal the gap completely and causes slight leakage of the gas, the pressure variation reducing means is able to control the pressure of the gas surrounding the main seal means to a low pressure. In this manner, the pressure of the gas surrounding the main seal means can be controlled not to rapidly change and to be the low pressure, irrespective of the pressure variation in the gas on the higher-pressure side. Thus, even when the gas on the higher-pressure side varies in a large variation range between a high pressure and a low pressure, it is possible to inhibit occurrence of the blistering phenomenon in the main seal means. As a result, a high seal ability is obtained. In addition, since the pressure of the gas surrounding the main seal means is controlled to be a low pressure, it is possible to inhibit the gas from permeating the main seal means. As a result, a higher seal ability is surely obtained.

The sub-seal means may be disposed such that the concave groove opens toward a lower-pressure side region. In accordance with the present invention, the sub-seal means is disposed such that the concave groove opens toward the lower-pressure side region to be able to seal the gap formed between the two seal surfaces when the pressure of the gas on the higher-pressure side turns from a high pressure to a low pressure. This makes it possible to inhibit rapid decrease in the pressure of the gas surrounding the main seal means from the high pressure to the low pressure. Also, the pressure variation reducing means is able to gradually decrease the pressure of the gas surrounding the main seal means. In this manner, rapid change in the pressure of the gas surrounding the main seal means can be inhibited. Thus, even when the pressure of the gas on the higher-pressure side varies in a large variation range between a high pressure and a low pressure, it is possible to inhibit occurrence of the blistering phenomenon in the main seal means. As a result, a high seal ability is maintained.

BEST MODE FOR CARRYING OUT THE INVENTION

Figure 1:
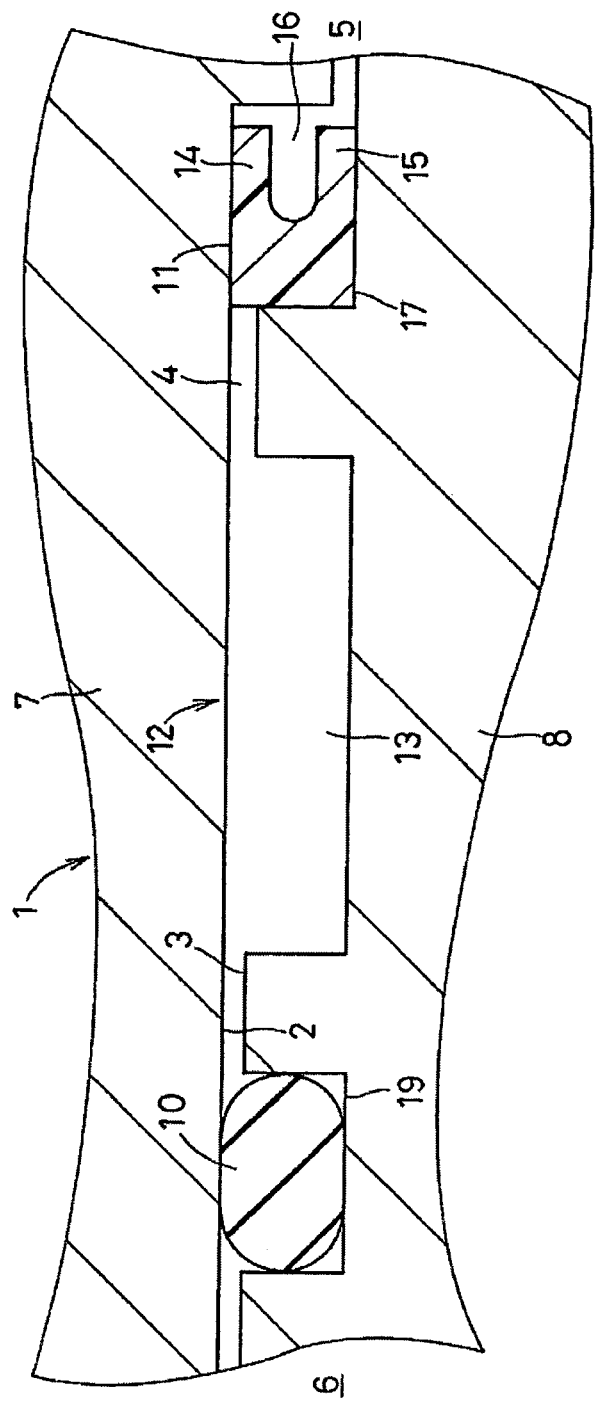
FIG. 1 is a cross-sectional view of a gas seal structure according to a first embodiment of the present invention, showing a state in which a space on a higher-pressure side is in a high-pressure condition.
Figure 2:
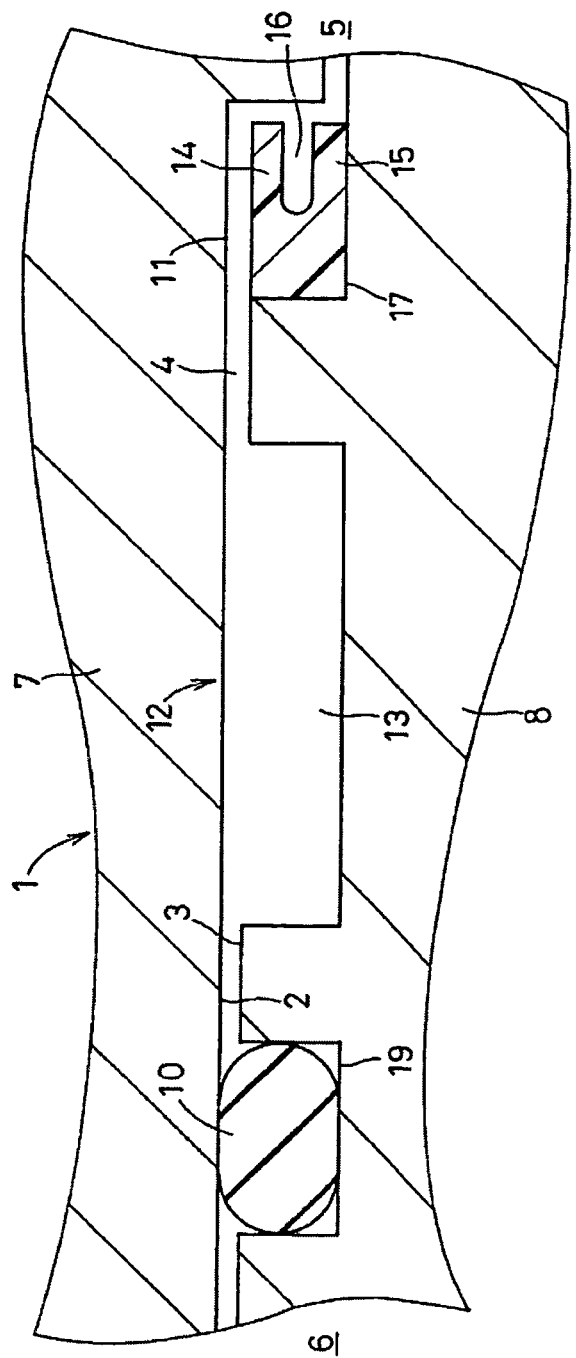
FIG. 2 is a cross-sectional view of the gas seal structure of FIG. 1, showing a state in which the space on the higher-pressure side is in a low-pressure condition.
Figure 3:
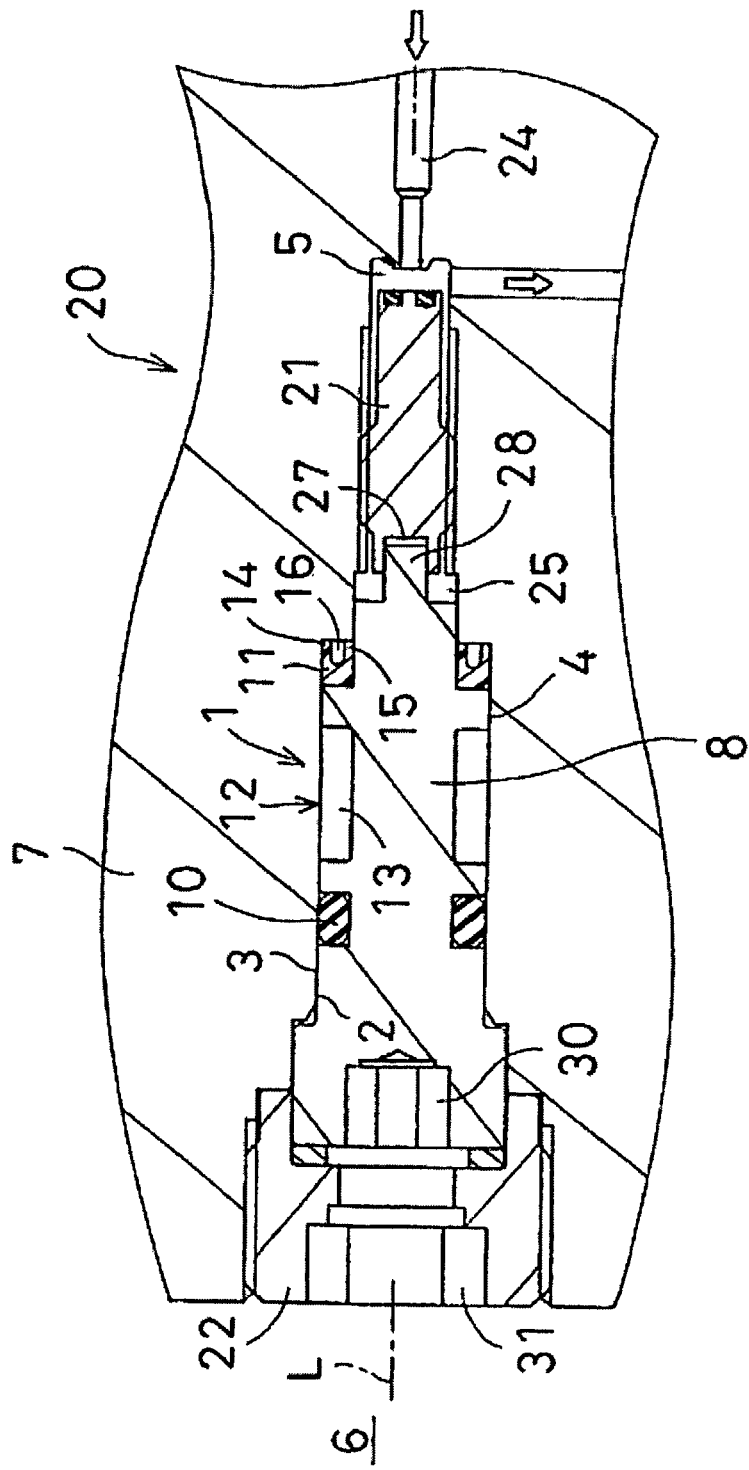
FIG. 3 is a cross-sectional view showing a valve device provided with the gas seal structure of FIG. 1.

FIG. 1 is a cross-sectional view of a gas seal structure 1 according to a first embodiment of the present invention, showing a state in which a space 5 on a higher-pressure side is in a high-pressure condition. FIG. 2 is a cross-sectional view of the gas seal structure 1, showing a state in which the higher-pressure side space 5 is in a low-pressure condition. FIG. 3 is a cross-sectional view showing a valve device 20 provided with the gas seal structure 1 (hereinafter also referred to as a seal structure). The seal structure 1 serves to seal a gap between two opposite seal surfaces 2 and 3 to thereby inhibit a gas from leaking from a higher-pressure side space 5 into a lower-pressure side space 6 through a gap 4 formed between the seal surfaces 2 and 3. The seal surfaces 2 and 3 are surfaces of two members 7 and 8 disposed opposite to each other. So, the gap 4 is formed between the two opposite members 7 and 8. As used herein, the term "higher-pressure side" refers to a higher-pressure side and the term "lower-pressure side" refers to a lower-pressure side with respect to the seal structure 1.

In this embodiment, the member (one member) 7 has an inner surface region of a substantially cylindrical shape, and the member (opposite member) 8 has an outer surface region of a substantially cylindrical shape. Therefore, the seal surfaces 2 and 3 are an inner peripheral surface of the member 7 and an outer peripheral surface of the member 8, respectively, and are substantially cylindrical.

The seal structure 1 is suitable for use with a device configured such that a pressure variation including a rapid pressure drop occurs in a gas pressure PH in the higher-pressure side space 5 in a large variation range between a high pressure and a low pressure. Also, the seal structure 1 is suitable for use with a device configured such that a gas such as a hydrogen gas and a helium gas, which have small molecular weight and high permeability with respect to rubber members are introduced to the higher-pressure side space 5. Thus, the seal structure 1 is particularly suitably used to inhibit leakage of the gas with pressure variation and high permeability.

The blistering phenomenon that has been described in connection with the background art typically occurs when the pressure of a surrounding region of a rubber member rapidly decreases from a pressure higher than a blistering occurrence limit pressure Pbc to a pressure of the blistering occurrence limit pressure Pbc or lower, for example, a pressure near an atmospheric pressure. The blistering phenomenon does not occur if the pressure of the surrounding region rapidly decreases from the pressure of the blistering occurrence limit pressure Pbc or lower. In the present invention, the term "high pressure" means a pressure higher than the blistering occurrence limit pressure, and the term "low pressure" means a pressure of the blistering occurrence limit pressure or lower, for example, the atmospheric pressure and a pressure near the atmospheric pressure.

The blistering phenomenon does not occur if a decreasing speed is low even when the pressure of the surrounding gas decreases from a high pressure to a low pressure. In the present invention, the term "rapid decrease of the pressure" means a pressure decrease occurring at a speed that is not less than a decreasing speed at which the blistering phenomenon occurs. The blistering phenomenon does not occur if a pressure variation difference is small even when the pressure of the surrounding gas decreases from the high pressure to the low pressure. In the present invention, the term "large variation range" means a variation pressure difference or more between a maximum pressure and a minimum pressure, at which the blistering phenomenon occurs. The blistering occurrence limit pressure Pbc is determined by a structure of the corresponding rubber member.

The seal structure 1 includes a seal member 10 which is a main seal means, a sub-seal member 11 which is a sub-seal means, and a pressure variation reducing means 12. The main seal member 1D is a rubber seal means made of natural rubber or synthetic rubber and is disposed between the two opposite seal surfaces 2 and 3. The sub-seal member 11 is a resin seal means including fluorine based resin such as polytetrafluoroethylene (PTFE) or synthetic resin such as polyamide resin (nylon). The sub-seal member 11 is disposed between the seal surfaces 2 and 3 and positioned closer to the higher-pressure side space 5 than the main seal member 10. The pressure variation reducing means 12 includes a variation reducing space 13 formed between the main seal member 10 and the sub-seal member 11 and is connected to a gap 4 between the seal surfaces 2 and 3.

The main seal member 10 is an annular seal member and is formed of, for example, an O-ring. This O-ring is an O-ring according to, for example, JIS B 2401, or a commercially available O-ring. At least one of the members 7 and 8 is provided with a concave portion on a surface region thereof to form a main seal member holding space 19 continuous with the gap 4. The main seal member 10 is fitted into the main seal member holding space 19 so as to elastically contact the members 7 and 8. In this embodiment, the member 8 is provided with the concave portion to form the main seal member holding space 19.

The sub-seal member 11 is an annular seal member constructed in such a manner that two protruding sealing lips 14 and 15 extend in a circumferential direction thereof, and a concave groove 16 is formed between the sealing lips 14 and 15 to extend in the circumferential direction. The sub-seal member 11 is able to be deformed in such a manner that the sealing lips 14 and 15 move closer to and away from each other. In this embodiment, the sub-seal member 11 has a U-shaped cross-section which is formed by sectioning the sub-seal member 11 in the direction perpendicular to the circumferential direction.

At least one of the members 7 and 8 may be provided with a concave portion on the surface region thereof to form a sub-seal member holding space 17 continuous with the gap 4. The sub-seal member 11 is fitted into the sub-seal member holding space 17 in such a manner that the sealing lip 14 is in contact with the member 7 and the sealing lip 15 is in contact with the member 8. The sub-seal member 11 is disposed such that the concave groove 16 opens toward the higher-pressure side space 5. In this embodiment, the members 7 and 8 are provided with concave portions to form the sub-seal member holding space 17.

The variation reducing space 13 of the pressure variation reducing means 12 is formed by the concave portion formed on at least one of the surfaces of the members 7 and 8. Therefore, the pressure variation reducing means 12 includes a part of at least one of the members 7 and 8 that faces the concave portion which is the variation reducing space 13. The pressure variation reducing means 12 is formed so that a volume of the variation reducing space 13 is larger than a volume of the gap 4 formed between the seal members 10 and 11.

The seal structure 1 described above is provided in a valve device 20. For easier understanding, in the valve device 20, the same reference numerals as those of the seal structure 1 denotes the same or corresponding components. The valve device 20 is a hand-operated openable valve provided in a passage through which a gas flows. The valve device 20 includes a housing 7, a valve plug 21, an operating member 8, and a bonnet member 22. The housing 7, which is one member of the seal structure 1, is provided with a valve passage 24. A valve space 5, which is the higher-pressure side space in the seal structure 1, is formed at a position of the valve passage 24. An operating member space 25 is formed at a position of the valve passage 24 to be connected to the valve space 5 and to open to the outside. The operating member space 25 is a higher-pressure side space of the seal structure 1.

The valve plug 21 is threadedly engaged with the housing 7 so as to be fitted into the valve space 5. The valve plug 21 is rotatable around a predetermined reference axis L to be displaced in a direction along the reference axis L (hereinafter referred to as an axial direction) to cause the valve passage 24 to open and close. The operating member 8 is fitted into the operating member space 25 so as to extend coaxially with the valve plug 21. The bonnet member 22 threadedly engaged with the housing 7 serves to inhibit the operating member 8 from being taken out from the valve device 20. The operating member 8 is configured not to be displaced in the axial direction but to be rotatable around the reference axis L. As used herein, the term "rotation" include an angular displacement of 360 degrees or less.

The valve plug 21 and the operating member 8 are coupled to each other in such a manner that a coupling structure in which a coupling protrusion 28 having a polygon-column shaped outer peripheral surface and formed on the operating member 8 is fitted into a coupling concave portion 27 having a polygon-tubular inner peripheral surface and formed on the valve plug 21 allows the valve plug 21 and the operating member 8 to be displaced relative to each other in the axial direction and to inhibit them from rotating relative to each other around the reference axis L. The operating member 8 is provided with an engagement portion 30 into which an operator brings a tool into engagement with the engagement portion 30 through an insertion hole 31 formed on the bonnet member 22. The operator rotates the operating member 8, causing the valve plug 21 to rotate to be displaced in the axial direction. Thereby, the valve passage 24 open and close.

The valve device 20 is used for cases in which a gas with a pressure varying in a large pressure range between a high pressure and a low pressure is introduced into the valve space 5 and a pressure variation including a rapid pressure decrease may occur in the valve space 5. For the valve device 20 for such uses, the seal structure 1 is provided for the gap 4 formed between the housing 7 and the operating member 8 in order to inhibit leakage of the gas from the valve space 5 into an outside space 6 of the valve device 20 which is the lower-pressure side space. The outside space 6 opens to atmosphere, and in a low-pressure condition.

In accordance with this embodiment, the main seal member 10 made of rubber is able to seal the gap 4 regardless of whether the pressure PH of the gas in the valve space 5 is in a high-pressure condition or in a low-pressure condition. This makes it possible to achieve a high seal ability to inhibit leakage of the gas from the valve space 5 to the outside space 6.

At a region that is closer to the higher-pressure side space 5 than the main seal member 10, the sub-seal member 11 made of resin is disposed. The sub-seal member 11 is disposed such that the concave groove 16 opens toward the higher-pressure side space 5. The sub-seal member 11 is unable to close the gap 4 under the condition in which the pressure on the side where the concave groove 16 of the sub-seal member 11 is located is not higher than a pressure on the opposite side of the concave groove 16, i.e., the pressure of the gas on the higher-pressure side is not higher than the pressure on the lower-pressure side. Therefore, in the low-pressure condition, the sub-seal member 11 is unable to close the gap 4. However, the sub-seal member 11 is able to close the gap 4 under the condition in which the pressure on the side where the concave groove 16 is located is higher than the pressure on the opposite side of the concave groove 16, i.e., the pressure of the gas on the higher-pressure side is higher than the pressure on the lower-pressure side, because the sealing lips 14 and 15 are pushed to be away from each other by the gas pressure so as to contact the seal surfaces 2 and 3. Therefore, in the high-pressure condition, the sub-seal member 11 is able to close the gap 4.

The pressure in the outside space 6 and the pressure in the variation reducing space 13 of the pressure variation reducing means 12 are introduced to the main seal member 10. These pressures become the pressure of the gas surrounding the main seal member 10. If these pressures are set not to be higher than the blistering occurrence limit pressure Pbc of the main seal member 10 which is the rubber member, or set not to rapidly decrease, then occurrence of the blistering phenomenon of the main seal member 10 is inhibited. The pressure of the gas in the outside space 6 is an atmospheric pressure Patm, a low pressure, and a substantially constant pressure. Therefore, if the pressure in the variation reducing space 13 is set not to be higher than the blistering occurrence limit pressure Pbc or set not to rapidly decrease, then occurrence of the blistering phenomenon is inhibited.

In this embodiment, in the high-pressure condition in which the pressure PH of the gas in the valve space 5 is higher than the blistering occurrence limit pressure Pbc, the sub-seal member 11 closes the gap 4 to inhibit the pressure of the variation reducing space 13 from becoming the high pressure. In contrast, in the low-pressure condition in which the pressure PH of the gas in the valve space 5 is not higher than the blistering occurrence limit pressure Pbc, the pressure in the variation reducing space 13 does not become the high pressure, although the sub-seal member 11 does not close the gap 4. Thus, it is possible to inhibit the pressure in the variation reducing space 13 from becoming a pressure higher than the blistering occurrence limit pressure Pbc, and to inhibit occurrence of the blistering phenomenon in the main seal member 10. Since the gas pressure in the variation reducing space 13 is controlled to be low, even a highly permeable gas is difficult to permeate the main seal member 10. As a result, a higher seal ability is obtained.

The pressure variation reducing means 12 enables the sub-seal member 11 to surely inhibit occurrence of the blistering phenomenon in the main seal member 10. The sub-seal member 11 is made of resin and is therefore lower in flexibility than rubber seal members. Because of its low seal ability, the sub-seal member 11 may cause slight leakage of the gas. Even when such gas leakage occurs, such a gas is introduced to the variation reducing space 13 of the pressure variation reducing means 12 formed between the main seal member 10 and the sub-seal member 11. In this way, it is possible to suppress an increase in the pressure of the gas surrounding the main seal member 10 which may be caused by leakage of the gas. Thus, the high pressure is not directly applied to the main seal member 10 but the lowered pressure is applied to the main seal member 10. As should be appreciated, the pressure variation reducing means 12 is able to surely inhibit occurrence of the blistering phenomenon in the main seal member 10.

The pressure variation reducing means 12 will be described in more detail. If the variation reducing space 13 is able to surely reduce the pressure of the gas that leaks after the sub-seal member 11 closes the gap 4 in the variation reducing space 13, then occurrence of the blistering phenomenon in the main seal member 10 is surely inhibited. Therefore, it is desired that the variation reducing space 13 have a volume that is not less than a blistering inhibiting volume Vo that is able to reduce the pressure of the gas in the variation reducing space 13 so that the pressure of the gas does not increase up to the pressure higher than the blistering occurrence limit pressure Pbc. If the following formula (1) is satisfied, then occurrence of the blistering phenomenon in the main seal member 10 is surely inhibited.

$$Patm \times (Vo + k \times Q \times T) \leq Pbc \times Vo \quad (1)$$

Vo [cm$^3$] is the blistering inhibiting volume which is a minimum volume that is able to inhibit occurrence of the blistering phenomenon in the main seal member 10. Patm [Mpa abs.] (absolute pressure) is an atmospheric pressure (0.1 Mpa abs.). As described above, Pbc [Mpa abs.] (absolute pressure) is the blistering occurrence limit pressure of the main seal, member 10, and is an upper limit pressure at which the blistering phenomenon does not occur regardless of the pressure variation. k×Q [Ncm$^3$/hr] is a leakage amount of the gas that flows through the sub-seal member 11. k is a pressure coefficient determined by the pressure PH of the gas in the valve space 5. Therefore, the leakage amount of the gas (k×Q) is determined by the pressure PH of the gas in the valve space 5. T(hr) is a pressure application time for which the pressure PH of the gas in the valve space 5 is applied to the sub-seal member 11.

The formula (1) may be converted into a formula (2):

$$Vo \geq (Patm \times k \times Q \times T)/(Pbc - Patm) \quad (2)$$

By providing the pressure variation reducing means 12 with the variation reducing space 13 having the volume that is not less than the blistering inhibiting volume Vo represented by the formula (2), it is possible to surely inhibit occurrence of the blistering phenomenon in the main seal member 10. Since the pressure in the outside space 6 is an atmospheric pressure Patm, the blistering inhibiting volume Vo is represented using the atmospheric pressure Patm as described above. When the pressure in the outside space 6 is not the atmospheric pressure Patm, the blistering inhibiting volume Vo is found by replacing Patm by the pressure in the outside space 6 in the formulae (1) and (2).

In this manner, the seal structure 1 is able to control the pressure of the gas surrounding the main seal member 10 to a low pressure. In addition, even when the sub-seal member 11 does not seal the gas completely and thereby the gas leaks in a little amount, the pressure variation reducing means 12 is able to control the pressure of the gas surrounding the main seal member 10 to the low pressure in the seal structure 1. Thus, the pressure of the gas surrounding the main seal member 10 is controlled to a low pressure and so as not to rapidly change, regardless of the variation in the pressure of the higher-pressure side gas. This makes it possible to inhibit occurrence of the blistering phenomenon in the main seal means when the pressure of the gas varies on the higher-pressure side varies.

If the pressure of the gas on the higher-pressure side which is the gas in the valve space 5 varies in a large variation range between a high pressure and a low pressure, it is possible to inhibit occurrence of the blistering phenomenon in the main seal member 10. Thereby, the seal structure 1 is able to maintain a high seal ability and is suitably used to inhibit leakage of the gas, the pressure of which varies greatly and becomes a high pressure. Furthermore, the seal structure 1 is achieved by a simple construction including the main seal member 10, the sub-seal member 11, and the pressure variation reducing means 12.

Figure 4:
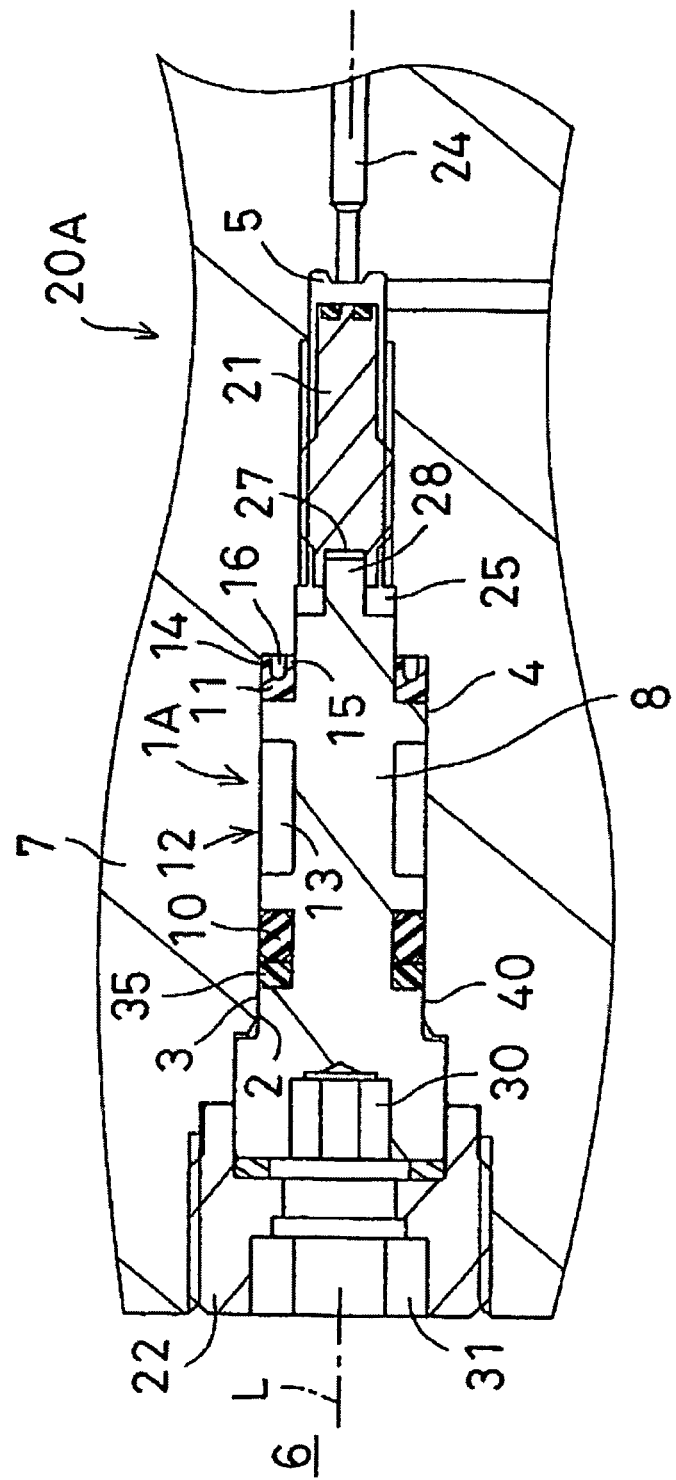
FIG. 4 is a cross-sectional view showing a valve device provided with a seal structure according to a second embodiment of the present invention.

FIG. 4 is a cross-sectional view showing a valve device 20A provided with a seal structure 1A of a second embodiment of the present invention. The seal structure 1A of the second embodiment is similar to the seal structure 1 of the first embodiment. In the seal structure 1A, the same reference numerals as those of the seal structure 1 denote the same or corresponding parts, and therefore only different components will be described. The seal structure 1A of the second embodiment includes the seal structure 1 and a back-up ring 35. The back-up ring 35 is fitted-into the main seal member holding space 19 and is disposed at a region closer to the lower-pressure side space 6 than the main seal member 10. The seal structure 1A of the second embodiment is able to achieve the effects as in the seal structure 1 of the first embodiment. Furthermore, the back-up ring 35 is able to inhibit the main seal member 10 from protruding into a region of the gap 4 located closer to the lower-pressure side space 6 than the main seal member holding space 19.

Figure 5:
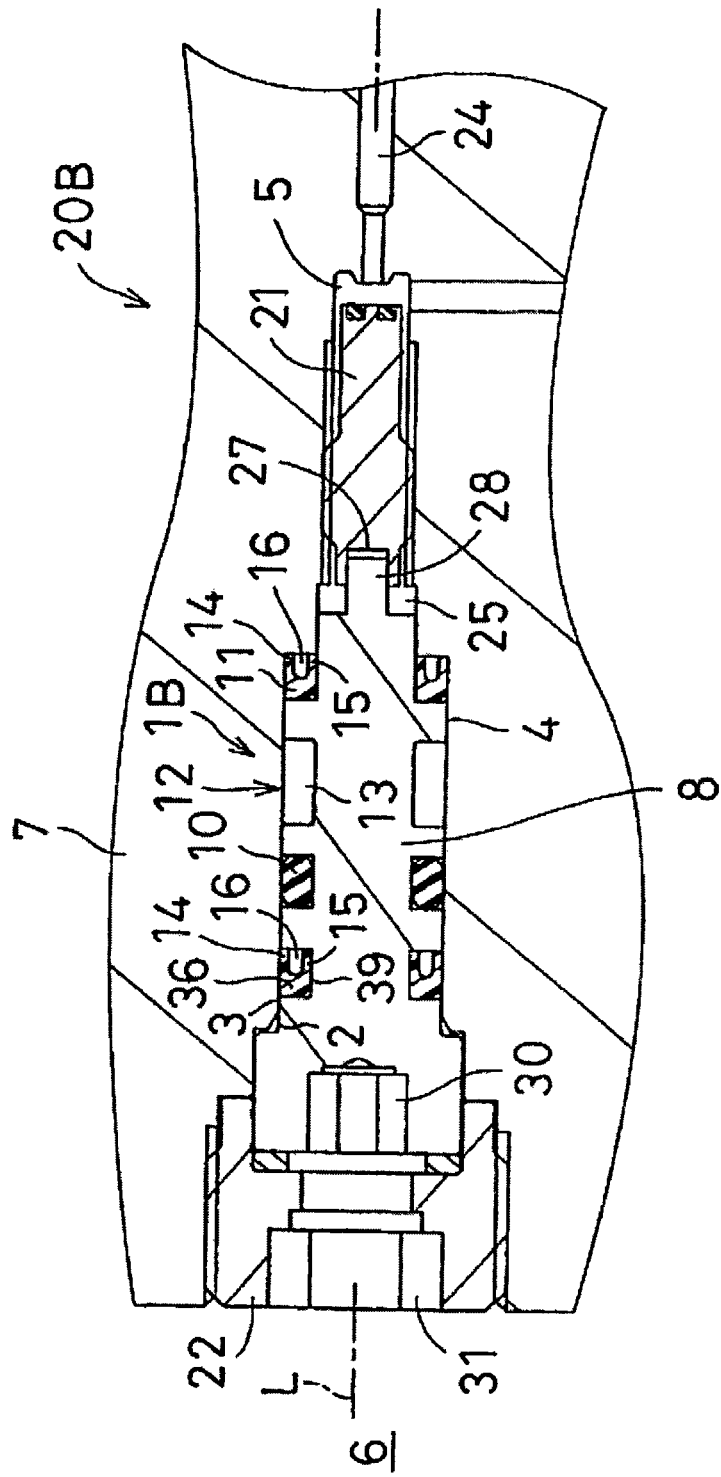
FIG. 5 is a cross-sectional view showing a valve device provided with a seal structure according to a third embodiment of the present invention.

FIG. 5 is a cross-sectional view showing a valve device 20B provided with a seal structure 1B of a third embodiment of the present invention. The seal structure 1B of the third embodiment is similar to the seal structure 1 of the first embodiment. In the seal structure 1B, the same reference numerals as those of the seal structure 1 denote the same or corresponding parts, and therefore only different components will be described. The seal structure 1B of the third embodiment includes the seal structure 1 of the first embodiment and an auxiliary seal member 36 which is an auxiliary seal means. The auxiliary seal member 36 is disposed between the seal surfaces 2 and 3 and is located at a region closer to the lower-pressure side space 6 than the main seal member 10.

At least one of the members 7 and 8 is provided with a concave portion on a surface thereof at a region closer to the lower-pressure side space 6 than the main seal member 10. In this embodiment, the member 8 is provided with the concave portion to form an auxiliary seal member holding space 39 continuous with the gap 4. The auxiliary seal member 36 is fitted into the auxiliary seal member holding space 39. The auxiliary seal member 36 has a structure similar to that of the sub-seal member 11, and is disposed such that the concave groove 16 opens toward the higher-pressure side space 5. In the auxiliary seal member 36, the same reference numerals as those of the sub-seal member 11 denote the same or corresponding parts. The seal structure 1B of the third embodiment is able to achieve the effects as in the seal structure 1 of the first embodiment. Furthermore, the auxiliary seal member 36 is able to enhance sealing ability.

Figure 6:
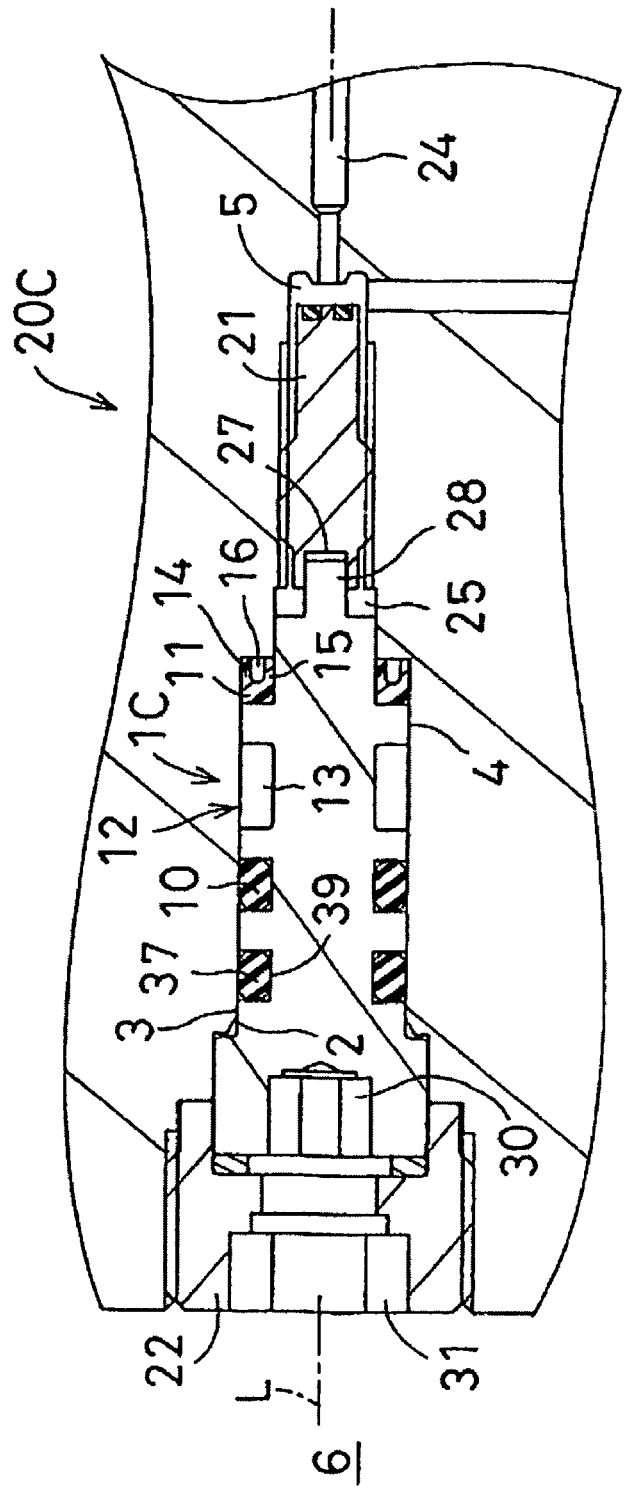
FIG. 6 is a cross-sectional view showing a valve device provided with a seal structure according to a fourth embodiment of the present invention.

FIG. 6 is a cross-sectional view showing a valve device 20C provided with a seal structure 1C according to a fourth embodiment of the present invention. The seal structure 1C of the fourth embodiment is similar to the seal structures 1 and 1B of the first and third embodiments. In the seal structure 1C, the same reference numerals as those of the seal structures 1 and 1B denote the same or corresponding parts, and therefore only different components will be described. The seal structure 1C of the fourth embodiment includes the seal structure 1 of the first embodiment and an auxiliary seal member 37 which is an auxiliary seal means. The auxiliary seal member 37 is disposed at a position corresponding to the auxiliary seal member 36 in the third embodiment. The auxiliary seal member 37 has a structure similar to that of the main seal member 36. The auxiliary seal member 37 is fitted into the auxiliary seal member holding space 39 so as to elastically contact the seal surfaces 2 and 3. The seal structure 1C of the fourth embodiment is able to achieve the effects as in the seal structure 1 of the first embodiment. Furthermore, the auxiliary seal member 37 is able to enhance seal ability.

Figure 7:
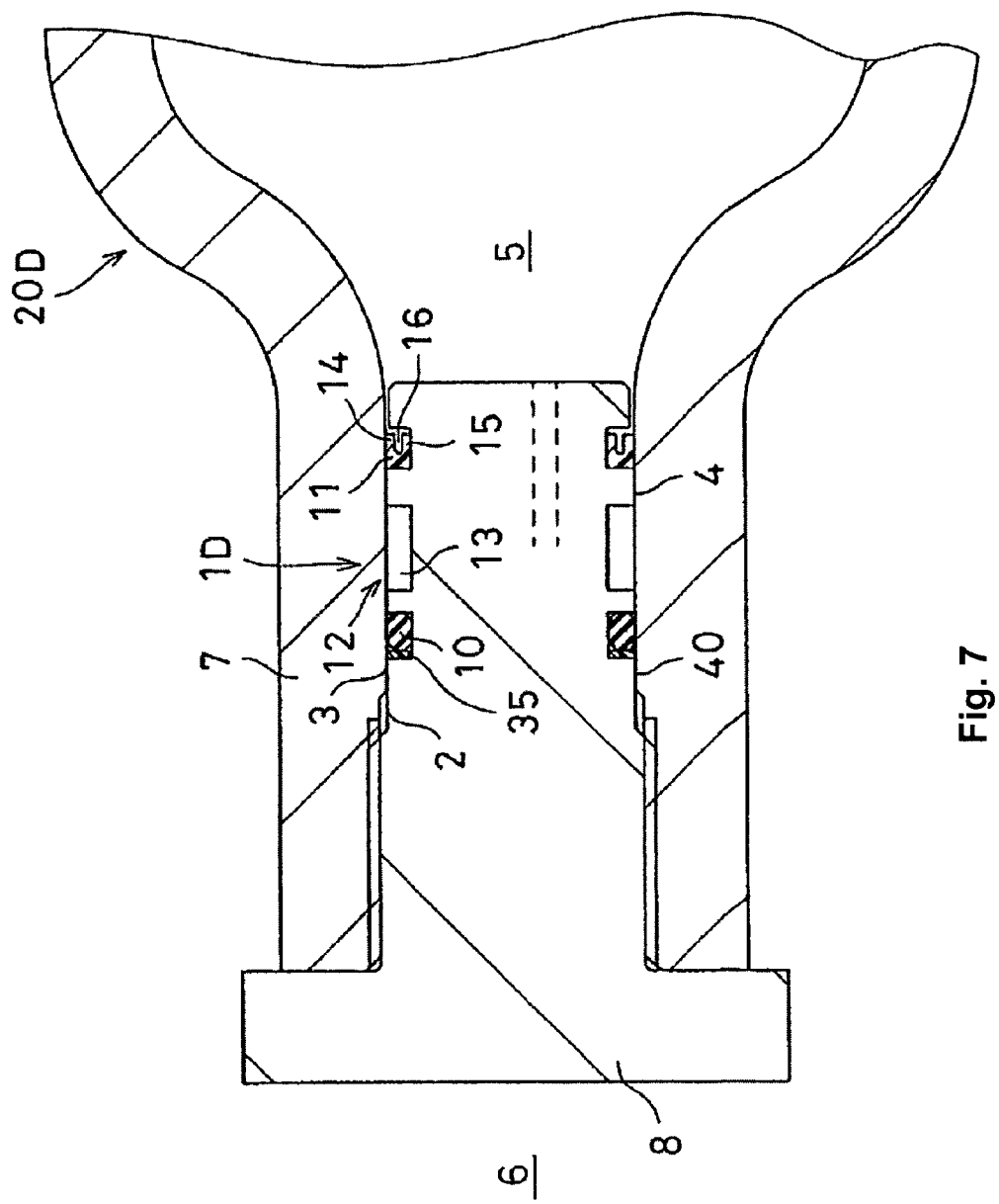
FIG. 7 is a cross-sectional view showing a gas tank device provided with a seal structure according to a fifth embodiment of the present invention.

FIG. 7 is a cross-sectional view showing a gas tank device 20D provided with a seal structure 1D of the fifth embodiment of the present invention. The seal structure 1D of the fifth embodiment is similar to the seal structure 1A of the second embodiment. In the seal structure 1D, the same reference numerals as those of the seal structure 1A denotes the same or corresponding parts, and therefore only different components will be described. While the seal structure 1A of the second embodiment is provided in the valve device 20A, the seal structure 1D of the fifth embodiment is provided in the gas tank device 20D that stores a gas. The gas tank device 20D includes a tank body 7 and a cap member 8 threadedly engaged with an opening formed on the tank body 7. The fifth seal structure 1D is provided for the gap 4 between the tank body 7 and the cap member 8, and serves to inhibit leakage of the gas from the space 5 in the interior of the tank body 7 into the space 6 outside the tank body 7.

In the fifth embodiment, the tank body 7 is one member, and its surface is one seal surface 2. The cap member 8 is an opposite member, and its surface is an opposite seal surface 3. The space 5 in the interior of the tank body 7 is the higher-pressure side space, and the space 6 outside the tank body 7 is the lower-pressure side space. The seal structure 1D of the fifth embodiment is able to inhibit leakage of the gas from the space 5 in the interior of the tank body 7 to the space 6 outside the tank body 7, as in the seal structure 1A of the second embodiment.

Figure 8:
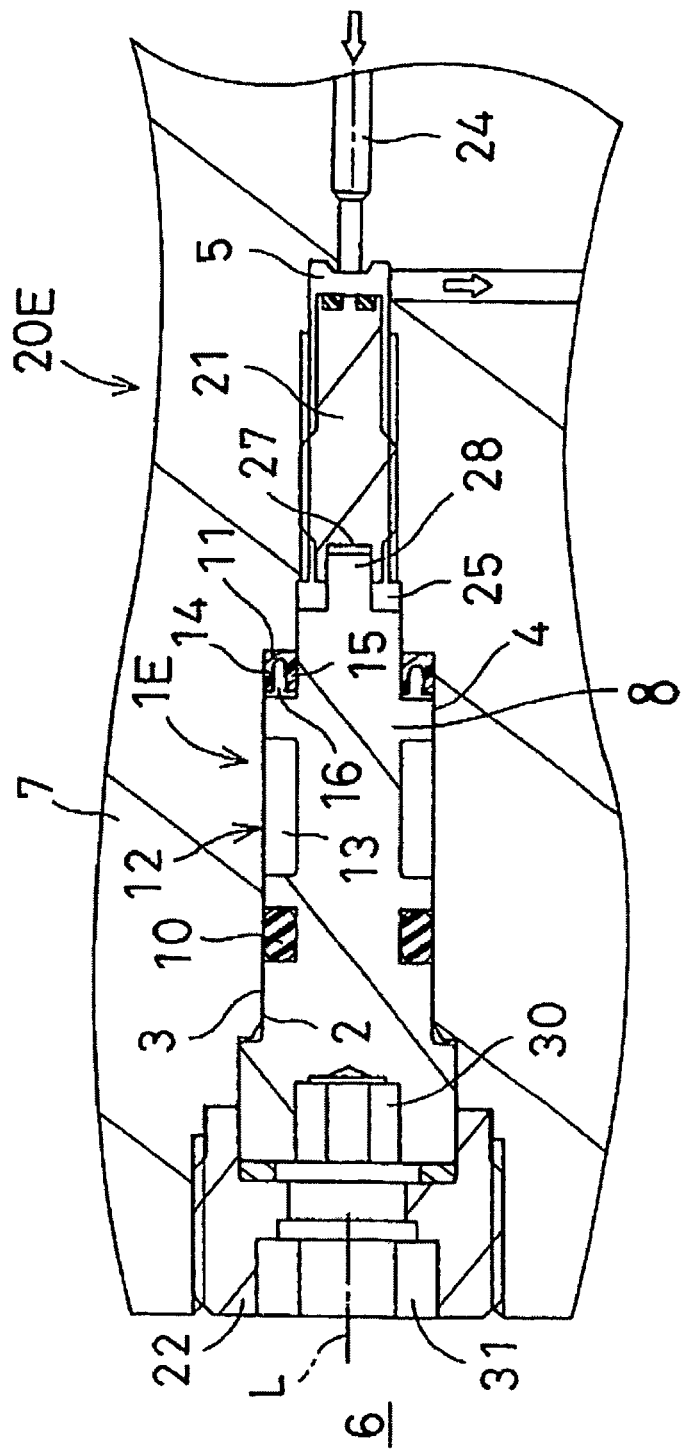
FIG. 8 is a cross-sectional view showing a valve device provided with a seal structure according to a sixth embodiment of the present invention.

FIG. 8 is a cross-sectional view showing a valve device 20E provided with a seal structure 1E of a sixth embodiment of the present invention. The seal structure 1E of the sixth embodiment is similar to the seal structure 1 of the first embodiment. In the seal structure 1E, the same reference numerals as those of the seal structure 1 denote the same or corresponding parts, and therefore only different components will be described. While the sub-seal member 11 of the seal structure 1 of the first embodiment is disposed such that the concave groove 16 opens toward the higher-pressure side space 5, the sub-seal member 11 of the sixth embodiment is disposed such that the concave groove 16 opens toward the lower-pressure side space 6. The sub-seal member 11 has a structure similar to that of the seal structure 1 of the first embodiment.

In the sixth embodiment, the main seal member 10 is able to achieve seal as in the first embodiment. The sub-seal member 11 located closer to the higher-pressure side space 5 than the main seal member 10 is disposed such that the concave groove 16 opens toward the lower-pressure side space 6. The sub-seal member 11 is unable to close the gap 4 under the condition in which the pressure on the side where the concave groove 16 is located is not higher than the pressure on the opposite side of the concave groove 16, i.e., the pressure of the gas on the lower-pressure side is not higher than the pressure on the higher-pressure side. Therefore, in the above mentioned high-pressure condition, the sub-seal member 11 is unable to close the gap 4. However, the sub-seal member 11 is able to close the gap 4 under the condition in which the pressure on the side where the concave groove 16 is located is higher than the pressure on the opposite side of the concave groove 16, i.e., the pressure of the gas on the lower-pressure side is higher than the pressure on the higher-pressure side, because the sealing lips 14 and 15 are pushed to be away from each other by the gas pressure so as to contact the seal surfaces 2 and 3. Therefore, in the low-pressure condition, the sub-seal member 11 is able to close the gap 4.

According to the sixth embodiment, under the high-pressure condition in which the pressure PH of the gas in the valve space 5 is higher than the blistering occurrence limit pressure Pbc, the sub-seal member 11 is unable to close the gap 4, whereas under the low-pressure condition, the sub-seal member 11 is able to close the gap 4. Therefore, even when the pressure PH in the valve space 5 rapidly decreases from the high pressure to the low pressure, it is possible to inhibit the gas existing between the main seal member 10 and the sub-seal member 11 from flowing into the valve space 5 and to inhibit the pressure in the variation reducing space 13 from rapidly decreasing. Thus, the pressure in the variation reducing space 13 decreases slowly or does not decrease. Thus, even when the pressure in the variation reducing space 13 becomes higher than the blistering occurrence limit pressure Pbc, it is possible to inhibit rapid decrease in the pressure and to thus inhibit occurrence of the blistering phenomenon in the main seal member 10.

In the sixth embodiment configured as described above, the pressure variation reducing means 12 is able to cause the sub-seal member 11 to surely inhibit occurrence of the blistering phenomenon in the main seal member 10. Since the sub-seal member 11 is made of resin and is therefore lower in flexibility than rubber seal members, its responsiveness is slow. So, the sub-seal member 11 may sometimes fail to be deformed fully in response to the pressure variation in the valve space 5. Regardless of such a response delay, the pressure variation reducing means 12 formed between the main seal member 10 and the sub-seal member 11 is able to cause the gas in the pressure reducing space 13 to flow into the valve space 5, thus suppressing decrease in the pressure of the gas surrounding the main seal member 10. As a result, it is possible to inhibit rapid decrease in the pressure of the gas surrounding the main seal member 10 and to surely inhibit occurrence of the blistering phenomenon in the main seal member 10.

The volume of the variation reducing space 13 that is able to surely inhibit the occurrence of the blistering phenomenon in the main seal member 10 with the sub-seal member 11 disposed such that the concave groove 16 opens toward the lower-pressure side space 6, will not be described in detail. Obviously, provision of the pressure variation reducing means 12 enables occurrence of the blistering phenomenon in the main seal member 10 to be inhibited. In addition, the inventors confirmed that, by forming the variation reducing space 13 of the blistering inhibiting volume Vo found in the formula (2), the occurrence of the blistering phenomenon in the main seal member 10 can be inhibited in the structure in which the sub-seal member 11 is disposed such that the concave groove 16 opens toward the lower-pressure side space 6.

Thus, the seal structure 1E is able to inhibit occurrence of the blistering phenomenon in the main seal member 10 when the pressure of the gas on the higher-pressure side which is the gas in the valve space 5 varies in a large variation range between a high pressure and a low pressure, in the structure in which the sub-seal member 11 is disposed such that the concave groove 16 opens toward the lower-pressure side space 6. Thereby, the seal structure 1E is able to maintain a high seal ability and is suitably used to inhibit leakage of the gas, the pressure of which varies greatly and becomes a high pressure. Furthermore, the seal structure 1E is achieved by a simple construction including the main seal member 10, the sub-seal member 11, and the pressure variation reducing means 12.

Figure 9:
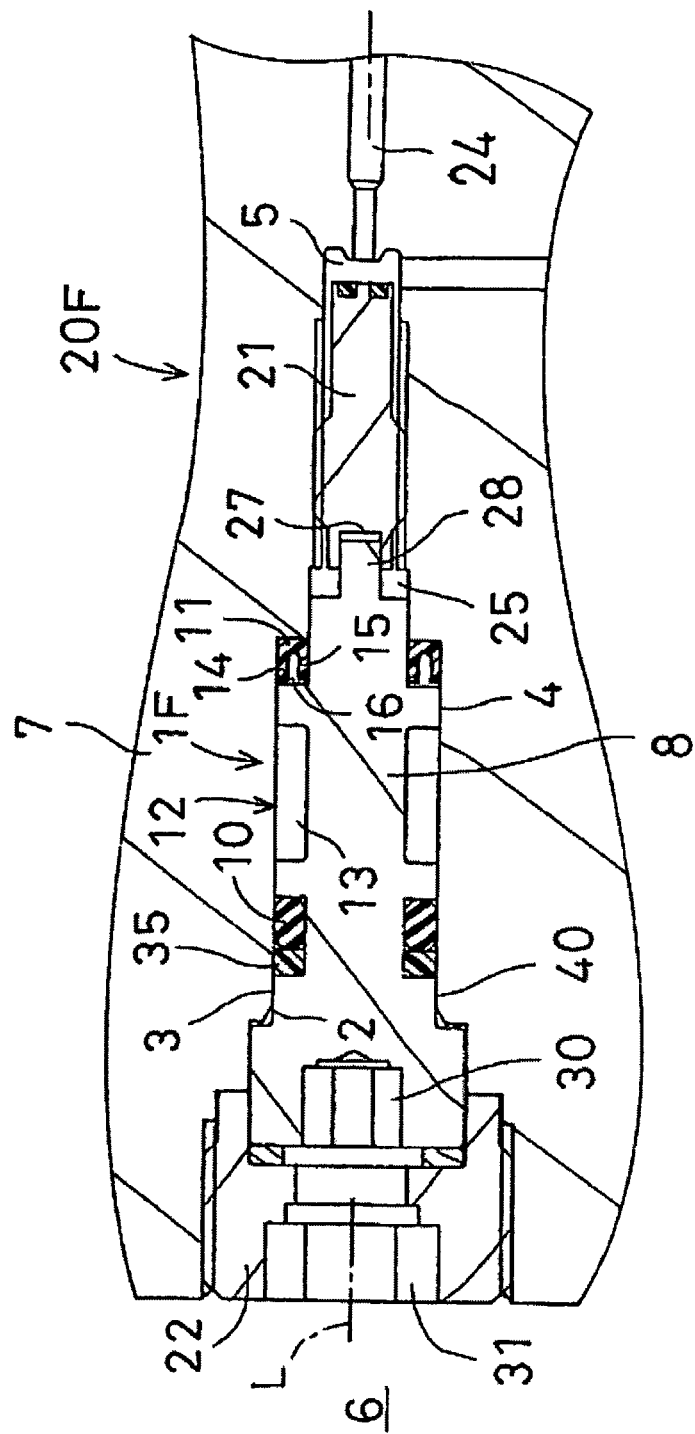
FIG. 9 is a cross-sectional view showing a valve device provided with a seal structure according to a seventh embodiment of the present invention.

FIG. 9 is a cross-sectional view showing a valve device 20F provided with a seal structure 1F according to a seventh embodiment of the present invention. The seal structure 1F of the seventh embodiment is similar to the seal structures 1, 1A and 1E of the first, second and sixth embodiments. In the seal structure 1F of the seventh embodiment, the same reference numerals as those of the seal structures 1, 1A, and 1E denote the same or corresponding parts, and therefore only different components will be described. The seal structure 1F of the seventh embodiment includes the seal structure 1E of the sixth embodiment and the back-up ring 35 of the second embodiment. The seal structure 1F of the seventh embodiment is able to achieve the effects as in the seal structure 1F of the seventh embodiment. Furthermore, the back-up ring 35 is able to suitably inhibit the main seal member 10 from protruding into a region 40 of the gap 4.

Figure 10:
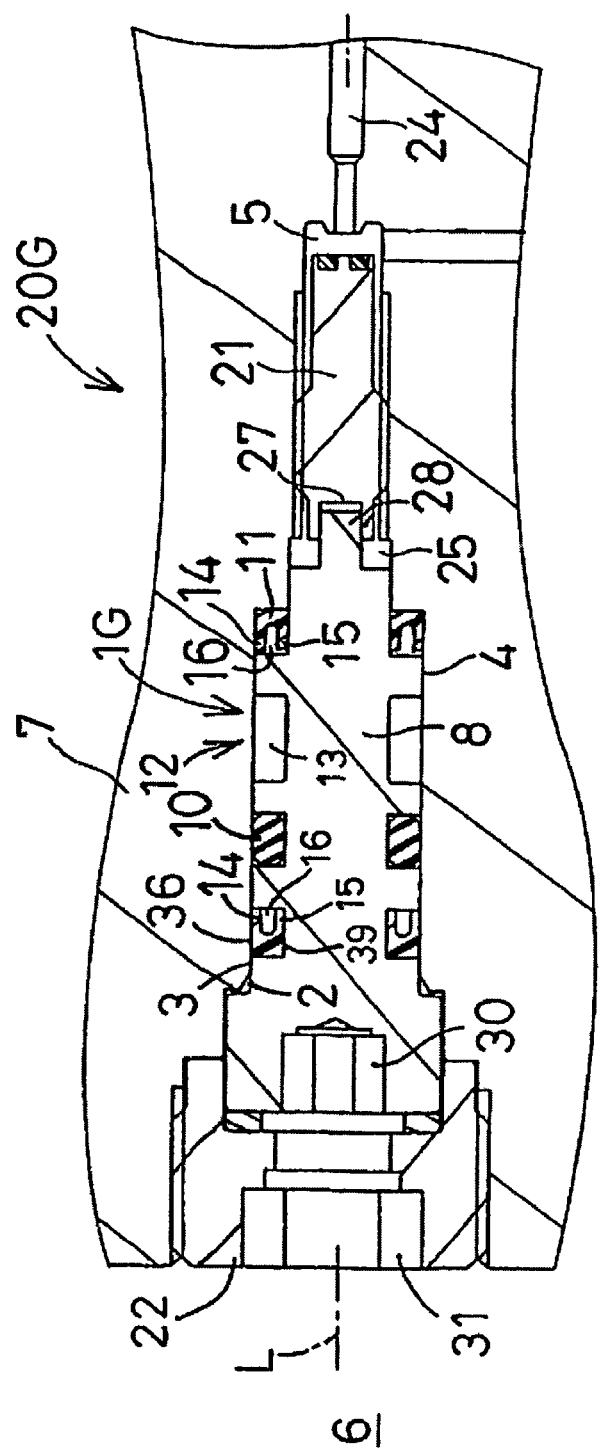
FIG. 10 is a cross-sectional view showing a valve device provided with a seal structure according to an eighth embodiment of the present invention.

FIG. 10 is a cross-sectional view showing a valve device 20G provided with a seal structure 1G of an eighth embodiment of the present invention. The seal structure 1G of the eighth embodiment is similar to the seal structures 1, 1B, and 1E of the first, third and sixth embodiments. In the seal structure 1G, the same reference numerals as those of the seal structures 1, 1B, and 1E denote the same or corresponding parts, and therefore only different components will be described. The seal structure 1G of the eighth embodiment includes the seal structure 1E of the sixth embodiment and the auxiliary seal member 36 of the third embodiment. The seal structure 1G of the eighth embodiment is able to achieve the effects as in the seal structure 1E of the sixth embodiment. Furthermore, the auxiliary seal member 36 is able to enhance the seal ability.

Figure 11:
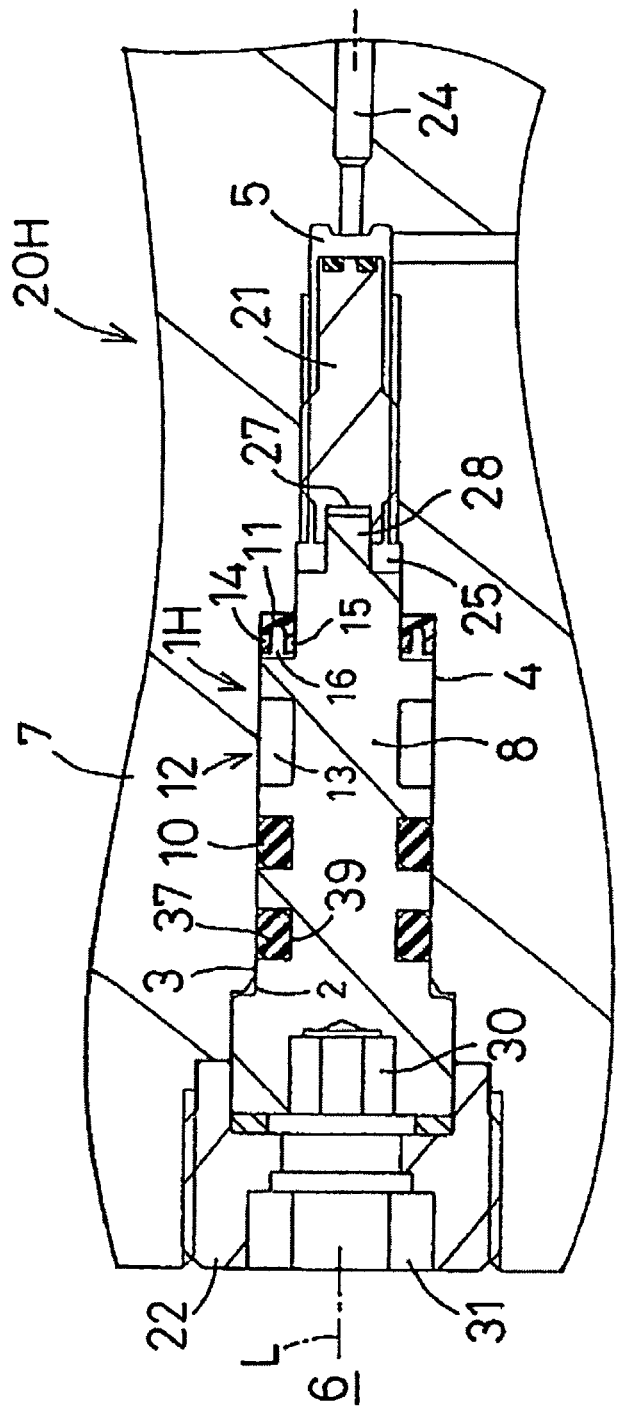
FIG. 11 is a cross-sectional view showing a valve device provided with a seal structure according to a ninth embodiment of the present invention.

FIG. 11 is a cross-sectional view showing a valve device 20H provided with a seal structure 1H of a ninth embodiment of the present invention. The seal structure 1H of the ninth embodiment is similar to the seal structures 1, 1C, and 1E of the first, fourth and sixth embodiments. In the seal structure 1H, the same reference numerals as those of the seal structures 1, 1C, and 1E denote the same ox corresponding parts, and therefore only different components will be described. The seal structure 1H of the ninth embodiment includes the seal structure 1E of the sixth embodiment and the auxiliary seal member 37 of the fourth embodiment. The seal structure 1H of the ninth embodiment is able to achieve the effects as in the seal structure 1E of the sixth embodiment. Furthermore, the auxiliary seal member 37 is able to enhance the seal ability.

Figure 12:
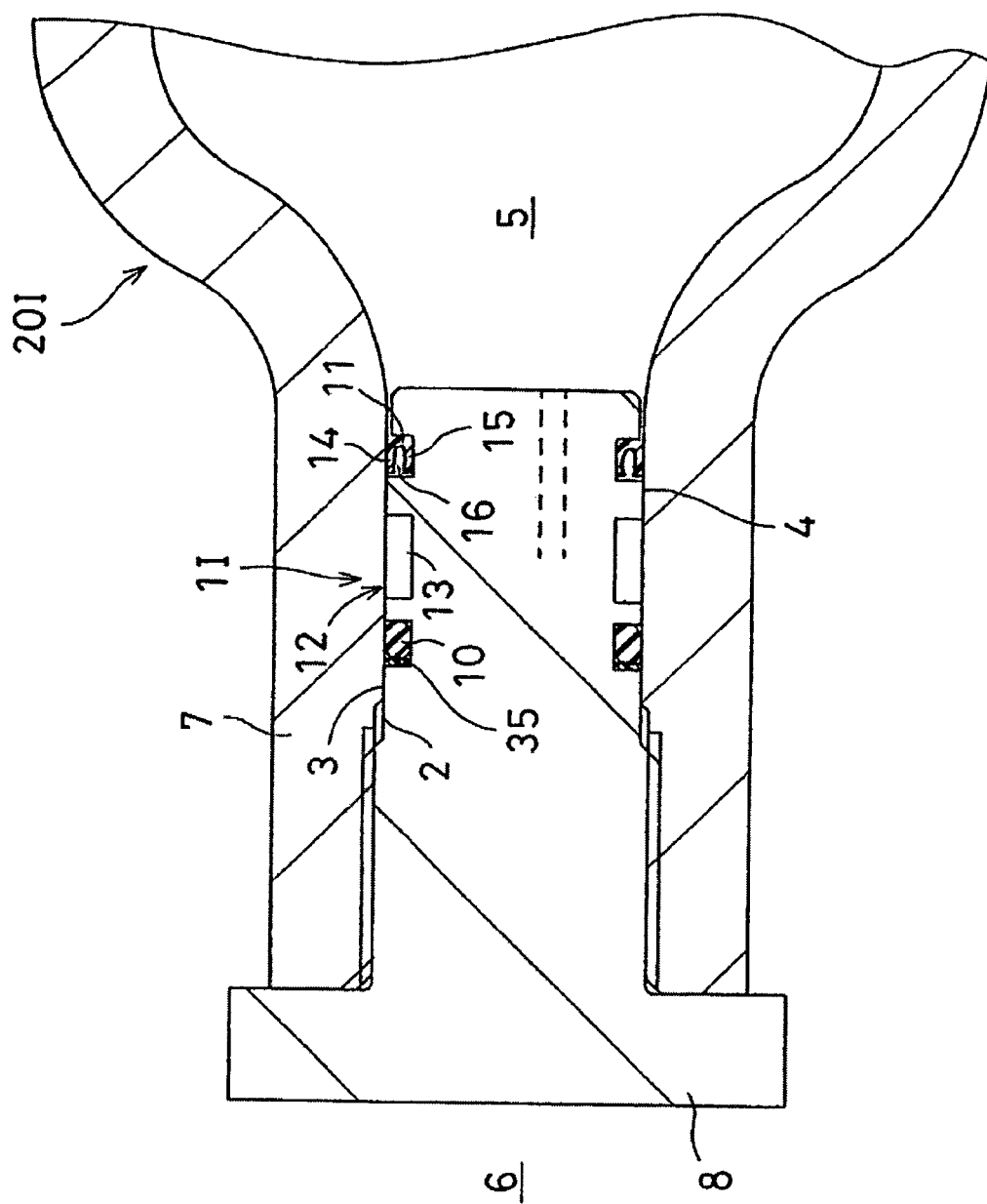
FIG. 12 is a cross-sectional view showing a gas tank device provided with a seal structure according to a tenth embodiment of the present invention.

FIG. 12 is a cross-sectional view showing a gas tank device 20I provided with a seal structure 1I of a tenth embodiment of the present invention. The seal structure 1I of the tenth embodiment is similar to the seal structures 1, 1D, and 1E of the first, fifth and sixth embodiments. In the seal structure 1I of the tenth embodiment, the same reference numerals as those of the seal structures 1, 1D, and 1E denote the same or corresponding parts, and therefore only different components will be described. While the seal structure 1E of the sixth embodiment is provided in the valve device 20E, the seal structure 1I of the tenth embodiment is provided in the gas tank device 20I which is similar to the gas tank device 20D of the fifth embodiment. The seal structure 1I of the tenth embodiment is able to inhibit leakage of the gas from the space 5 in the interior of the tank body 5 into the space 6 outside the tank body 7, as in the seal structure 1E of the sixth embodiment.

Figure 13:
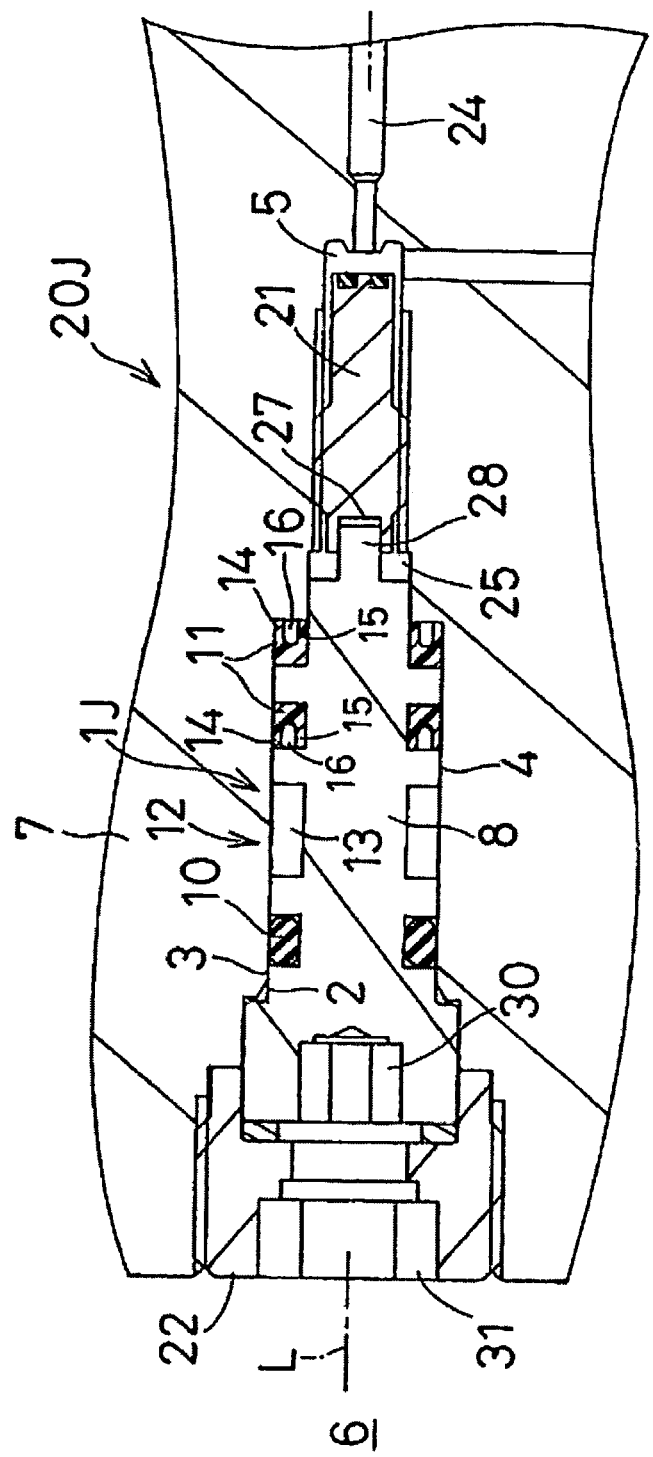
FIG. 13 is a cross-sectional view showing a valve device provided with a seal structure according to an eleventh embodiment of the present invention.

FIG. 13 is a cross-sectional view showing a valve device 20J provided with a seal structure 1J of an eleventh embodiment of the present invention. The seal structure 1J of the eleventh embodiment is similar to the seal structure 1 of the first embodiment. In the seal structure 1J, the same reference numerals as those of the seal structure 1 denote the same or corresponding parts, and therefore only different components will be described. The seal structure 1J of the eleventh embodiment is provided with a plurality of sub-seal members 11. At least one of the sub-seal members 11 is disposed such that the concave groove 16 opens toward the higher-pressure side space 5. The remaining sub-seal member 11 is disposed such that the concave groove 16 opens toward the lower-pressure side space 6. In this embodiment, two sub seal members 11 are provided. One sub-seal member 11 is disposed on the higher-pressure side such that the concave groove 16 opens the higher-pressure side space 5, and the other sub-seal member 11 is disposed on the lower-pressure side such that the concave groove 16 opens the lower-pressure side space 6.

In the seal structure 1J in which the plurality of sub-seal members 11 are provided to include the two sub-seal members 11 with the concave grooves 16 adapted to open in opposite directions, the sub-seal member 11 is disposed such that the concave groove 16 opens toward the higher-pressure side space 5. Therefore, the seal structure 1J is able to achieve the effects as in the seal structure 1 of the first embodiment. In addition, since the sub-seal member 11 is disposed such that the concave groove 16 opens toward the lower-pressure side space 6, the seal structure 1J is able to achieve the effects as in the seal structure 1E of the sixth embodiment. This makes it possible to surely inhibit the occurrence of the blistering phenomenon in the main seal member 10 which may be caused by the variation in the pressure of the gas in the valve space 5.

Figure 14:
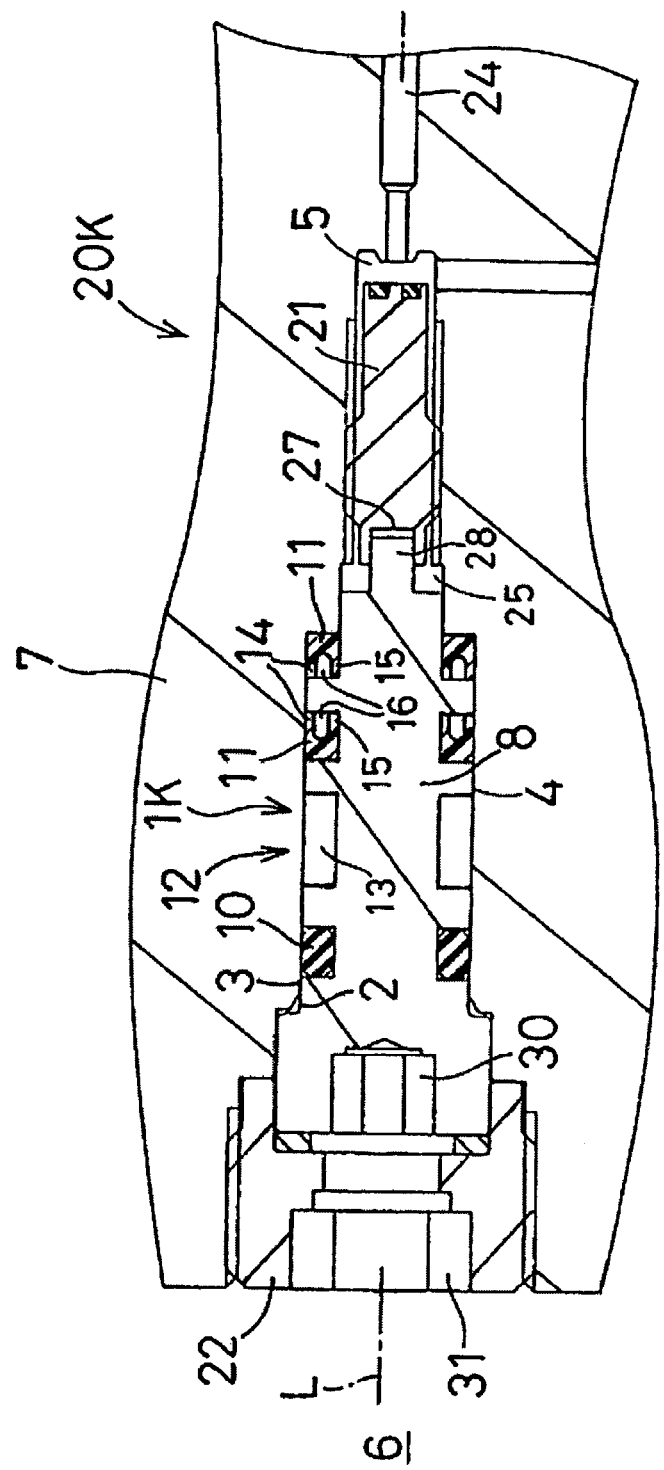
FIG. 14 is a cross-sectional view showing a valve device provided with a seal structure according to a twelfth embodiment of the present invention.

FIG. 14 is a cross-sectional view showing a valve device 20K provided with a seal structure 1K of a twelfth embodiment of the present invention. The seal structure 1K of the twelfth embodiment is similar to the seal structure 1J of the eleventh embodiment. In the seal structure 1K, the same reference numerals as those of the seal structure 1J denote the same or corresponding parts, and therefore only different components will be described. In the seal structure 1K of the twelfth embodiment, the one sub-seal member (one sub-seal member) 11 is disposed on the higher-pressure side such that the concave groove 16 opens toward the lower-pressure side space 6, and the other sub-seal member (opposite sub-seal member) 11 is disposed on the lower-pressure side such that the concave groove 16 opens toward the higher-pressure side space 5. The seal structure 1K of the twelfth embodiment is able to achieve the effects as in the seal structure 1J of the eleventh embodiment.

Figure 15:
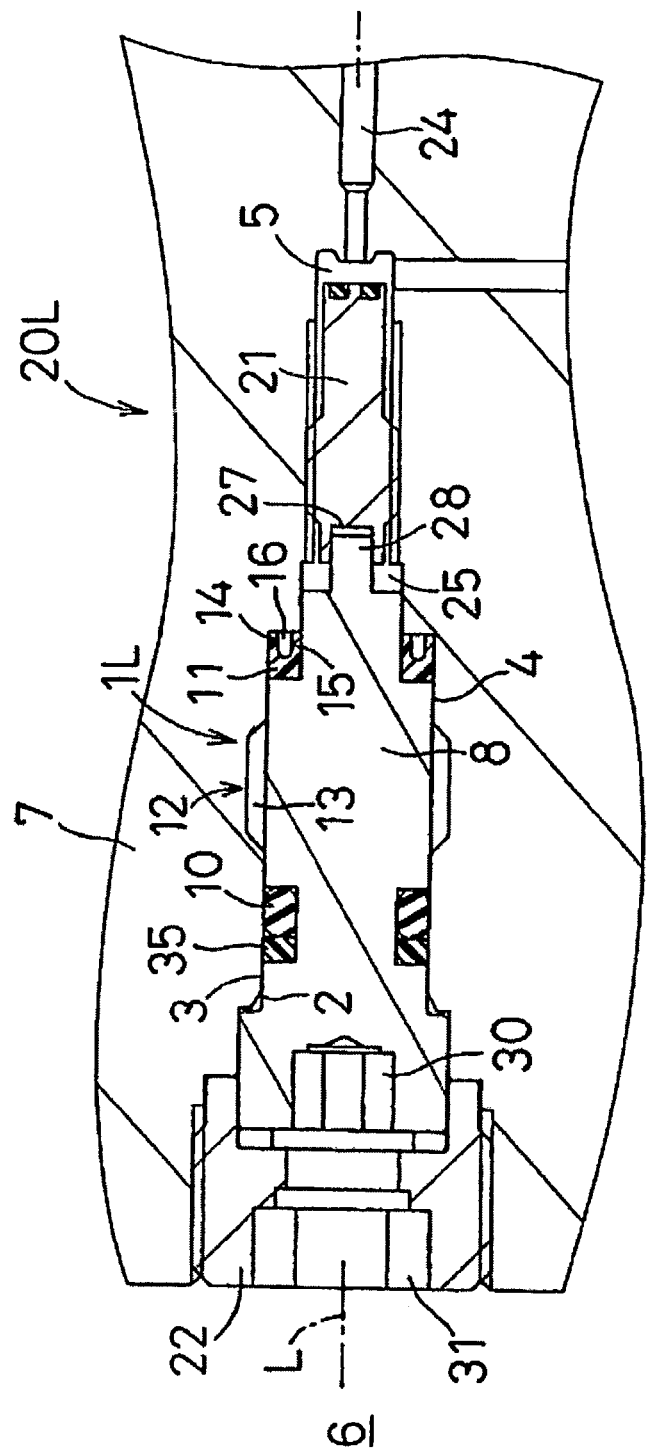
FIG. 15 is a cross-sectional view showing a valve device provided with a seal structure according to a thirteenth embodiment of the present invention.

FIG. 15 is a cross-sectional view showing a valve device 20L, provided with a seal structure 1L of a thirteenth embodiment of the present invention. The seal structure 1L of the thirteenth embodiment is similar to the seal structure 1A of the second embodiment. In the seal structure 1L of the thirteenth embodiment, the same reference numerals as those of the seal structure 1A denote the same or corresponding parts, and therefore only different components will be described. In the seal structure 1A of the second embodiment, the operating member 8 which is the opposite member is provided on the surface thereof with the concave portion with a rectangular cross-section to form the variation reducing space 13, while in the seal structure 1L of the thirteenth embodiment, the housing 7 which is the one member is provided on the surface thereof with a concave portion with a trapezoid cross-section to form the variation reducing space 13. Since the variation reducing space 13 thus structured is able to achieve the similar effects, the seal structure 1L of the thirteenth embodiment is able to achieve the effects as in the seal structure 1A of the second embodiment.

Figure 16:
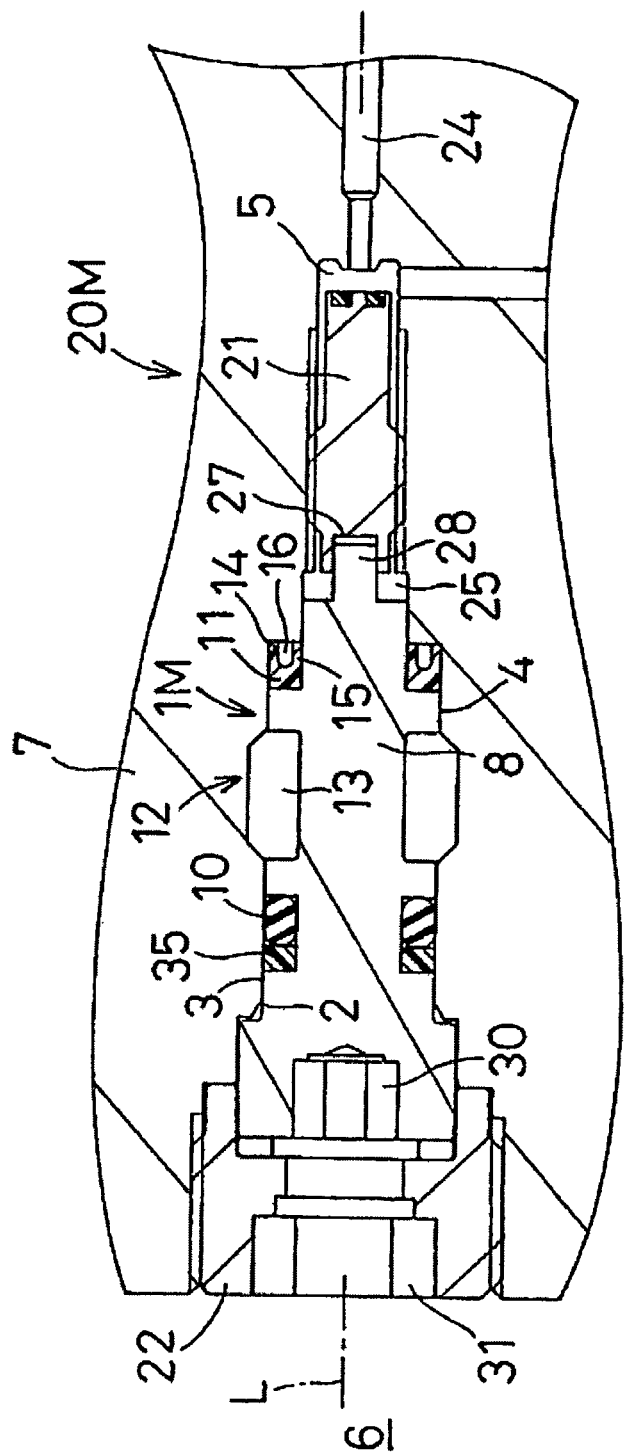
FIG. 16 is a cross-sectional view showing a valve device provided with a seal structure according to a fourteenth embodiment of the present invention.

FIG. 16 is a cross-sectional view showing a valve device 20M provided with a seal structure 1M of a fourteenth embodiment of the present invention. The seal structure 1M of the fourteenth embodiment is similar to the seal structures 1A and 1L of the second and thirteenth embodiments. In the seal structure 1M of the fourteenth embodiment, the same reference numerals as those of the seal structures 1A and 1L of the second and thirteenth embodiments denote the same or corresponding parts, and therefore only different components will be described. The seal structure 1M of the fourteenth embodiment includes the concave portion formed on the operating member 8 in the seal structure 1A of the second embodiment, and the concave portion formed on the housing 7 in the seal structure 1L of the thirteenth embodiment. These concave portions form the variation reducing space 13. Since the variation reducing space 13 is able to achieve the similar effects, the seal structure 1L of the thirteenth embodiment is able to achieve the effects as in the seal structure 1A of the second embodiment.

Figure 17:
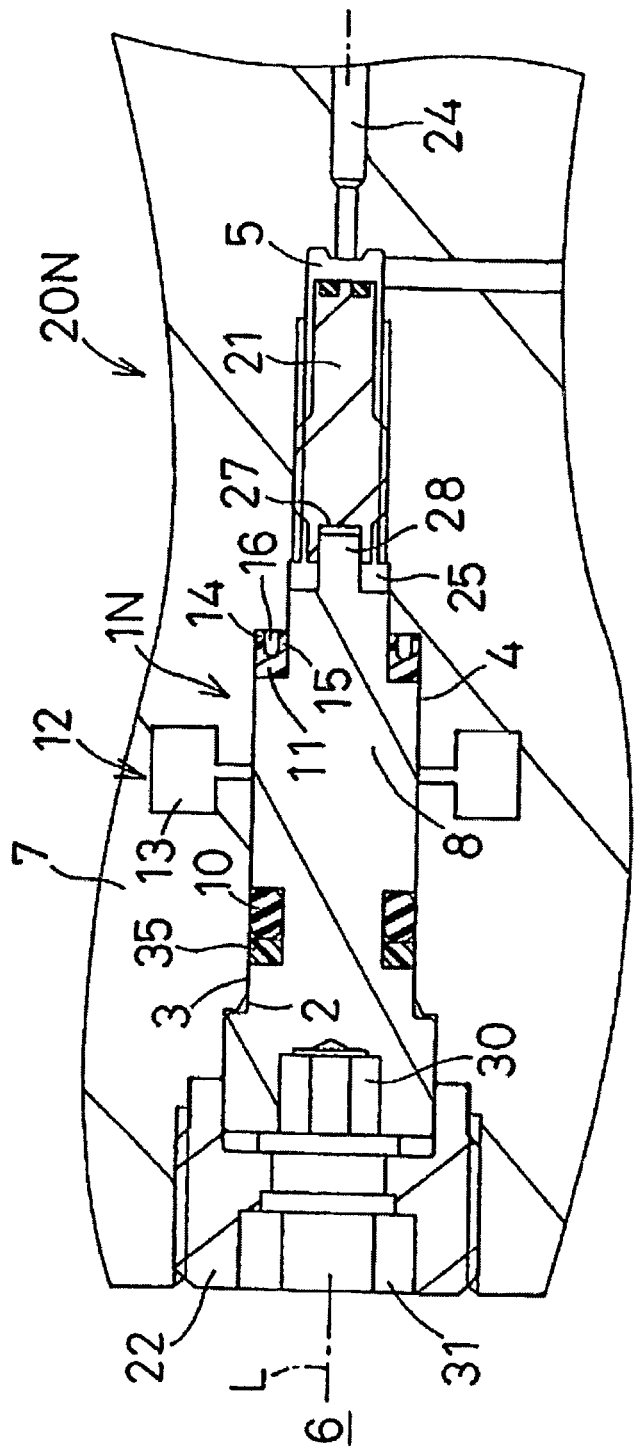
FIG. 17 is a cross-sectional view showing a valve device provided with a seal structure according to a fifteenth embodiment of the present invention.

FIG. 17 is a cross-sectional view showing a valve device 20N provided with a seal structure 1N of a fifteenth embodiment of the present invention. The seal structure 1N of the fifteenth embodiment is similar to the seal structure 1A of the second embodiment. In the seal structure 1N of the fifteenth embodiment, the same reference numerals as those of the seal structure 1A of the second embodiment denote the same or corresponding parts, and therefore only different components will be described. In the seal structure 1A of the second embodiment, the operating member 8 which is the opposite member is provided on the surface thereof with the concave portion with a rectangular cross-section to form the variation reducing space 13, while in the seal structure 1N of the fifteenth embodiment, a space is formed in the interior of the housing 7 which is the one member and a small passage that opens on the surface thereof is formed to be connected to the space, thus forming the variation reducing space 13. Since the variation reducing space 13 thus formed is able to achieve the similar effects, the seal structure 1N of the fifteenth embodiment is able to achieve the effects as in the seal structure 1A of the second embodiment. In the seal structure 1N including the passage, the surface regions of the members 7 and 8, which is required to form the variation reducing space 13 can be made small, and a distance between the main seal member 10 and the sub-seal member 11 can be reduced.

The above mentioned embodiments are merely exemplary, and constructions thereof may be modified within a scope of the present invention. For example, the seal surfaces 2 and 3 may be of a flat shape or of other curved shape. The seal surfaces 2 and 3 may be adapted to be slidable rather than rotatable, or otherwise may be adapted not to rotate relative to each other as in the fifth embodiment. The range of the pressure variation and the type of the gas are not intended to those illustrated above. The above mentioned seal structures may be provided in devices other than the valve devices and the gas tank devices. The two members provided with the seal structures are not particularly limited.

The sub-seal member is required to have a concave groove, desirably, two sealing lips that sandwiches the concave groove. The shape of the concave groove is not intended to be limited to a U-shape, but way be a C-shape, a Y-shape, or a V-shape. Furthermore, a seal ability may be increased to hold springs adapted to apply a spring force in the direction to cause the sealing lips to become away from each other.

INDUSTRIAL APPLICABILITY

In accordance with the present invention, it is possible to inhibit occurrence of a blistering phenomenon in a main seal means even when a pressure of a gas on a higher-pressure side varies in a large variation range between a high pressure and a low pressure, and to thereby maintain a high seal ability. Therefore, the seal structure of the present invention is suitably used to inhibit leakage of the gas, the pressure of which varies greatly and becomes a high pressure.

The invention claimed is:

1. A gas seal structure for use with a gas having a high permeability with respect to a rubber material, the gas seal structure comprising:
   a main seal means that is made of the rubber material and is disposed between two seal surfaces;

a sub-seal means that is made of resin and is disposed between the two seal surfaces, the sub-seal means being located closer to a higher-pressure region than the main seal means and being provided with a concave groove, the higher-pressure region arranged to receive the gas having a high permeability with respect to a rubber member, such that the sub-seal means is positioned to be exposed to the gas; and a pressure variation reducing means comprising a variation reducing space connected only to a gap located between the main seal means and the sub-seal means, the pressure variation reducing means and the gap located between and defined by the two seal surfaces, the variation reducing space being closed by the main seal means and the sub-seal means such that the variation reducing space is disconnected from atmosphere; and the variation reducing space being formed by a concave portion formed in one of the two seal surfaces, the variation reducing space and the gap each having a volume, and wherein the volume of the variation reducing space is larger than the volume of the gap formed between the two seal surfaces.

2. The gas seal structure according to claim 1, wherein the sub-seal means is disposed such that the concave groove opens toward the higher-pressure side region.

3. The gas seal structure according to claim 1, wherein the sub-seal means is disposed such that the concave groove opens toward a lower-pressure side region.

4. A gas seal structure comprising:

a main seal comprising a rubber material, the main seal disposed between two seal surfaces, the rubber material having a high permeability when exposed to a gas having a low molecular weight;

a sub-seal comprising a resin material, the sub-seal disposed between the two seal surfaces, the sub-seal disposed closer to a higher-pressure region than the main seal;

a concave groove formed in the sub-seal;

a gap formed between the two seal surfaces adjacent the sub-seal;

an enclosed pressure variation reducing space disposed between the main seal and the sub-seal and in flow communication with and bounded on at least one side by the gap, the pressure variation reducing space formed at least in part by a concave portion formed in either of the two seal surfaces and between the main seal and the sub-seal, the concave portion forming a volume greater than a volume of the gap and arranged to inhibit occurrence of a blistering phenomenon in the main seal.

5. The gas seal structure according to claim 4, wherein the sub-seal is disposed such that the concave groove opens toward the higher-pressure region.

6. The gas seal structure according to claim 4, wherein the sub-seal is disposed such that the concave groove opens toward a lower-pressure region, the main seal disposed closer to the lower pressure region than to the sub-seal.

7. A gas seal structure for use with a gas having a high permeability with respect to a rubber material, the gas seal structure comprising:

first and second opposing seal surfaces, the first and second opposing seal surfaces movable with respect to one another;

a concave portion carried by at least the first opposing seal surface;

a gap formed between the opposing seal surfaces and formed in part by a first distance between the opposing seal surfaces;

a main seal made of the rubber material and disposed between the opposing seal surfaces, the main seal disposed adjacent a lower pressure region;

a sub-seal made of resin and disposed between the opposing seal surfaces, the sub-seal disposed adjacent a higher pressure region;

the sub-seal having a concave groove oriented toward the higher-pressure region arranged and positioned to be exposed to the gas; and a pressure variation reducing space located between the opposing seal surfaces, the pressure variation reducing space defined by the second opposing seal surface and by the concave portion of the first opposing seal surface, the pressure variation reducing space formed in part by a second distance between the opposing seal surfaces, the second distance greater than the first distance;

the pressure variation reducing space disposed between the main seal and the sub-seal but separated from the sub-seal by the gap; and wherein a volume of the pressure variation reducing space is larger than a volume of the gap.

8. The gas seal structure according to claim 7, wherein the sub-seal is disposed in a sub-seal holding space, and wherein the sub-seal holding space and the variation reducing space are separated by the gap.

* * * * *

UNITED STATES PATENT AND TRADEMARK OFFICE
CERTIFICATE OF CORRECTION

PATENT NO. : 8,567,792 B2  
APPLICATION NO. : 10/575687  
DATED : October 29, 2013  
INVENTOR(S) : Kaoru Nomichi et al.

Page 1 of 1

It is certified that error appears in the above-identified patent and that said Letters Patent is hereby corrected as shown below:

On the Title Page

Item (73), the Assignee:

"Kawasaki Jukogyo Kaisha Kabusiha, Kobe-shi (JP)" should be

--Kawasaki Jukogyo Kabushiki Kaisha, Kobe-shi (JP); Mitsubishi Cable Industries, Ltd., Hyogo (JP)--

Signed and Sealed this  
Seventh Day of February, 2017

Michelle K. Lee  
*Director of the United States Patent and Trademark Office*